(12) United States Patent
Nesbitt

(10) Patent No.: US 11,958,322 B2
(45) Date of Patent: Apr. 16, 2024

(54) NON-PNEUMATIC TIRE HAVING REINFORCED SUPPORT STRUCTURE

(71) Applicant: Bridgestone Americas Tire Operations, LLC, Nashville, TN (US)

(72) Inventor: Adam K. Nesbitt, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 454 days.

(21) Appl. No.: 17/297,529

(22) PCT Filed: Dec. 12, 2019

(86) PCT No.: PCT/US2019/066008
§ 371 (c)(1),
(2) Date: May 27, 2021

(87) PCT Pub. No.: WO2020/139574
PCT Pub. Date: Jul. 2, 2020

(65) Prior Publication Data
US 2022/0032688 A1 Feb. 3, 2022

Related U.S. Application Data

(60) Provisional application No. 62/785,784, filed on Dec. 28, 2018.

(51) Int. Cl.
*B60C 7/14* (2006.01)
*B29D 30/02* (2006.01)
(Continued)

(52) U.S. Cl.
CPC .............. *B60C 7/146* (2021.08); *B29D 30/02* (2013.01); *B60C 7/20* (2013.01); *B60C 7/22* (2013.01)

(58) Field of Classification Search
CPC  B60C 7/107; B60C 7/146; B60C 7/18; B60C 7/22; B60C 7/20; B29D 30/02
See application file for complete search history.

(56) References Cited

U.S. PATENT DOCUMENTS

2008/0053586 A1   3/2008  Hanada et al.
2009/0283185 A1*  11/2009  Manesh .................... B60C 7/22
                                                        152/11
(Continued)

FOREIGN PATENT DOCUMENTS

CN    108472888     8/2018
JP    200830348     2/2008
(Continued)

OTHER PUBLICATIONS

International Search Report and Written Opinion; corresponding PCT Application No. PCT/US2019/066008; Authorized Officer Hwang, Chan Yoon; dated Apr. 6, 2020.
(Continued)

*Primary Examiner* — Kip T Kotter
(74) *Attorney, Agent, or Firm* — Shaun J. Fox; Bryan J. Jaketic

(57) ABSTRACT

A non-pneumatic tire includes an inner ring having an axis of rotation and an outer ring coaxial with the inner ring. The non-pneumatic tire further includes support structure extending from the inner ring to the outer ring. The support structure is constructed of a thermoplastic material and having reinforcement cords embedded therein. The non-pneumatic tire also includes a circumferential tread extending about the outer ring.

14 Claims, 9 Drawing Sheets

(51) Int. Cl.
*B60C 7/20* (2006.01)
*B60C 7/22* (2006.01)

(56) References Cited

U.S. PATENT DOCUMENTS

| | | | |
|---|---|---|---|
| 2010/0132858 A1* | 6/2010 | Arakawa | B60B 9/10 |
| | | | 152/7 |
| 2010/0132865 A1* | 6/2010 | Iwase | B60C 7/22 |
| | | | 152/301 |
| 2010/0200131 A1* | 8/2010 | Iwase | B60C 7/18 |
| | | | 152/209.1 |
| 2011/0079335 A1* | 4/2011 | Manesh | B60C 7/107 |
| | | | 152/310 |
| 2012/0234444 A1 | 9/2012 | Palinkas et al. | |
| 2012/0241062 A1 | 9/2012 | Manesh et al. | |
| 2018/0345610 A1* | 12/2018 | Delfino | B60C 7/14 |

FOREIGN PATENT DOCUMENTS

| | | | |
|---|---|---|---|
| JP | 200935050 | 2/2009 | |
| JP | 2010000761 | 1/2010 | |
| JP | 2011219009 | 11/2011 | |
| JP | 2014094699 | 5/2014 | |
| JP | 2015000609 | 1/2015 | |
| JP | 2015039987 A * | 3/2015 | |
| JP | 2015101210 | 6/2015 | |
| JP | 2015116870 | 6/2015 | |
| JP | 2018193046 | 12/2018 | |
| NL | 2002956 | 12/2010 | |
| WO | 2017116390 | 7/2017 | |
| WO | WO-2018126157 A1 * | 7/2018 | B60B 9/26 |

OTHER PUBLICATIONS

European Search Report; Corresponding European Application No. 19904748; dated Sep. 19, 2022.

* cited by examiner

NON-PNEUMATIC TIRE HAVING REINFORCED SUPPORT STRUCTURE

FIELD OF INVENTION

The present disclosure relates to a non-pneumatic tire, and a method of making the same. More particularly, the present disclosure relates to reinforced webbing, spokes, or other support structure of a non-pneumatic tire and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

The spokes or webbing may be made by a molding process. In some embodiments, the spokes or webbing are molded as a single, unitary piece. In other embodiments, multiple rings are molded and then axially joined to form the spoke or webbing structure. In still other embodiments, circular sectors are molded and then circumferentially joined to form the spoke or webbing structure.

SUMMARY OF THE INVENTION

In one embodiment, a method of making a non-pneumatic tire includes providing an inner ring having a first diameter and providing an outer ring having a second diameter greater than the first diameter. The method further includes providing at least one thermoplastic sheet having reinforcement cords disposed therein. The method also includes forming a plurality of non-linear components from the at least one thermoplastic sheet and connecting the plurality of non-linear components together to form a support structure. The method further includes connecting the support structure to the inner ring and connecting the support structure to the outer ring.

In another embodiment, a non-pneumatic tire includes an inner ring having an axis of rotation and an outer ring coaxial with the inner ring. The non-pneumatic tire further includes support structure extending from the inner ring to the outer ring. The support structure is constructed of a thermoplastic material and having reinforcement cords embedded therein. The non-pneumatic tire also includes a circumferential tread extending about the outer ring.

In yet another embodiment, a method of making a non-pneumatic tire includes providing a plurality of reinforcement cords and coating the plurality of reinforcement cords with a thermoplastic material to form a reinforced thermoplastic sheet. The method further includes cutting the reinforced thermoplastic sheet and forming a plurality of non-linear components from the cut reinforced thermoplastic sheet. The method also includes arranging the plurality of non-linear components into an annular shape, attaching the plurality of non-linear components to an inner ring, and attaching the plurality of non-linear components to an outer ring that is coaxial with the inner ring.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 10 is a schematic drawing illustrating a front view of one embodiment of a non-pneumatic tire.

DETAILED DESCRIPTION

Figure 1:
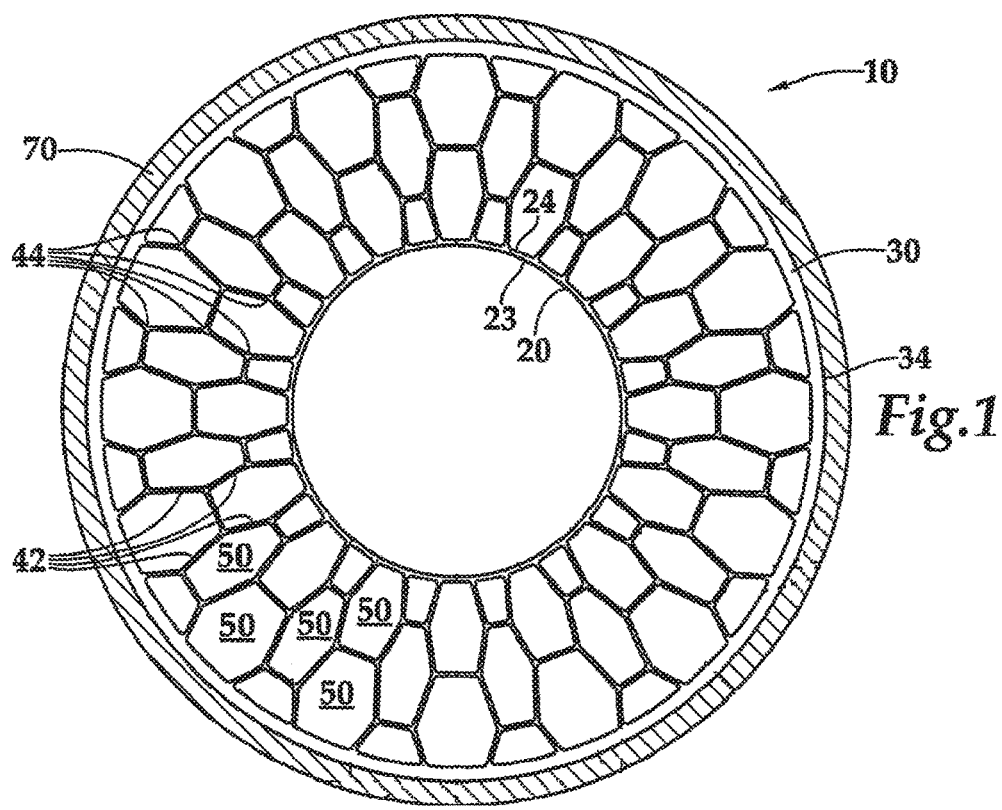
FIG. 1 is a front view of an undeformed non-pneumatic tire.
Figure 2:
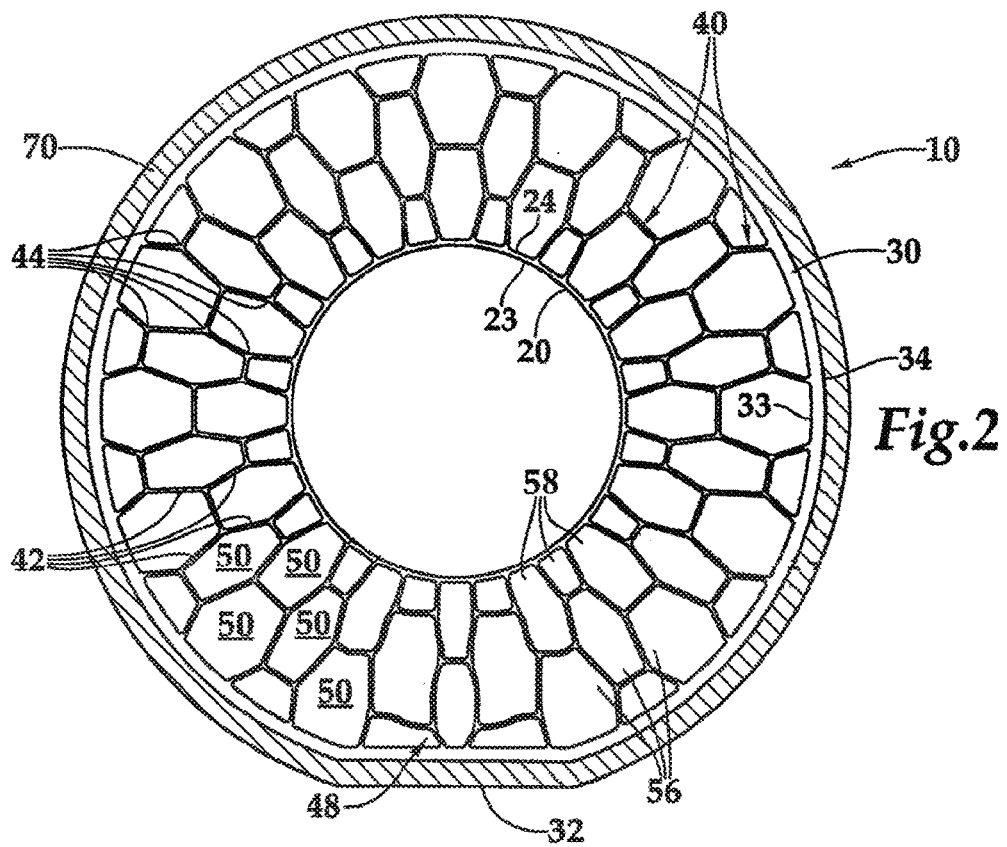
FIG. 2 is a front view of the non-pneumatic tire of FIG. 1 being deformed when subjected to a load.

FIGS. 1 and 2 illustrate one embodiment of a non-pneumatic tire 10. The non-pneumatic tire 10 is merely an exemplary illustration and is not intended to be limiting. In the illustrated embodiment, the non-pneumatic tire 10 includes a generally annular inner ring 20 that engages a rim (not shown) to which the tire 10 is mounted. The generally annular inner ring 20 has an internal surface 23 and an external surface 24 and can be made of an elastomeric material or metal.

The non-pneumatic tire 10 further includes a generally annular outer ring 30 surrounding an interconnected web 40, which is a support structure connected to the generally annular inner ring 20. In alternative embodiments, a plurality of spokes or other support structure connects the inner ring to the outer ring. The outer ring 30 can be configured to deform in an area 48 around and including a footprint region 32 (see FIG. 2), which decreases vibration and increases ride comfort.

In one embodiment, the generally annular inner ring 20 and the generally annular outer ring 30 are made of the same material as interconnected web 40. In an alternative embodiment, at least one of the generally annular inner ring, the generally annular outer ring, and the interconnected web are made of a different material. As shown in FIG. 1, the generally annular outer ring 30 can have a radially internal surface 33 and a radially external surface 34 to which a tread carrying layer 70 is attached. Attachment can be done adhesively or using other methods commonly available in the art.

In the illustrated embodiment, the interconnected web 40 has at least two radially adjacent layers 56, 58 of web elements 42 that define a plurality of generally polygonal openings 50 having vertices 44. In other embodiments (not shown), other web configurations may be employed. In another embodiment (not shown), spokes or other support structure may be employed instead of a web.

Figure 3:
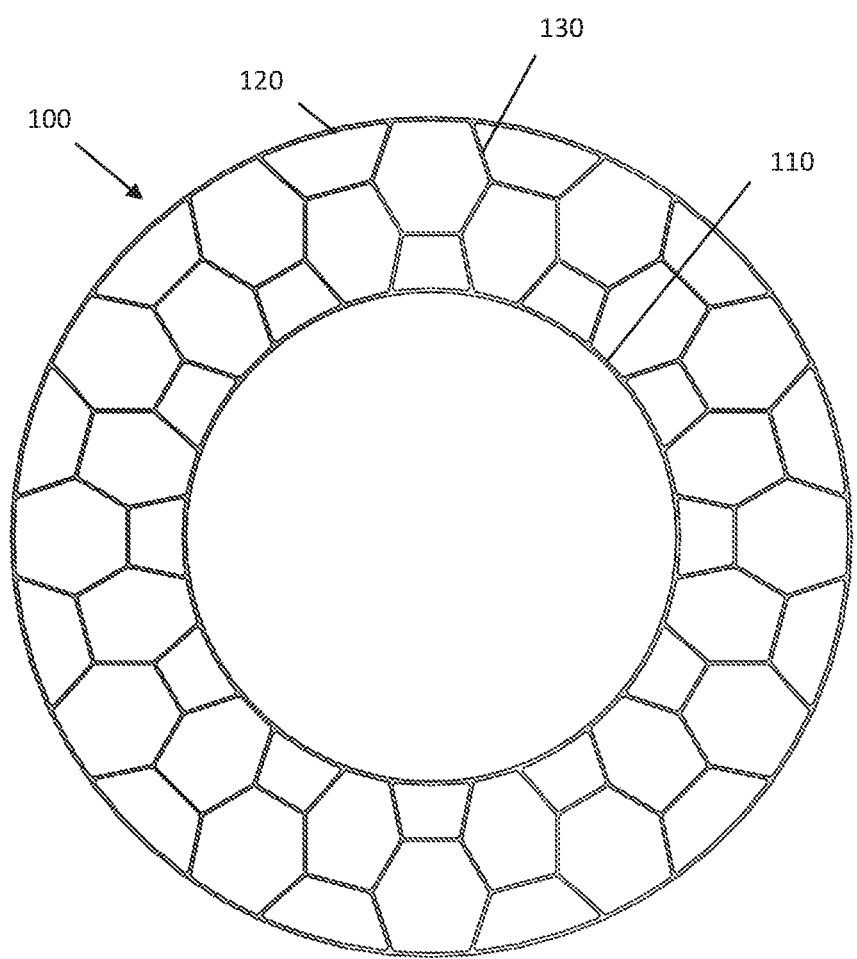
FIG. 3 is a front view of an alternative embodiment of a tire structure for a non-pneumatic tire.

FIG. 3 illustrates a front view of another embodiment of a tire structure 100 for a non-pneumatic tire. The tire structure 100 has a generally annular inner ring 110, a generally annular outer ring 120, and support structure in the form of an interconnected web extending between the inner ring 110 and the outer ring 120. The interconnected web is formed by a plurality of web elements 130 that define polygonal openings. In this particular embodiment, the web elements 130 form a plurality of hexagonal and substantially trapezoidal shapes, including an outer series of alternating hexagonal and trapezoidal opening and an inner series of alternating hexagonal and trapezoidal openings.

Figure 4:
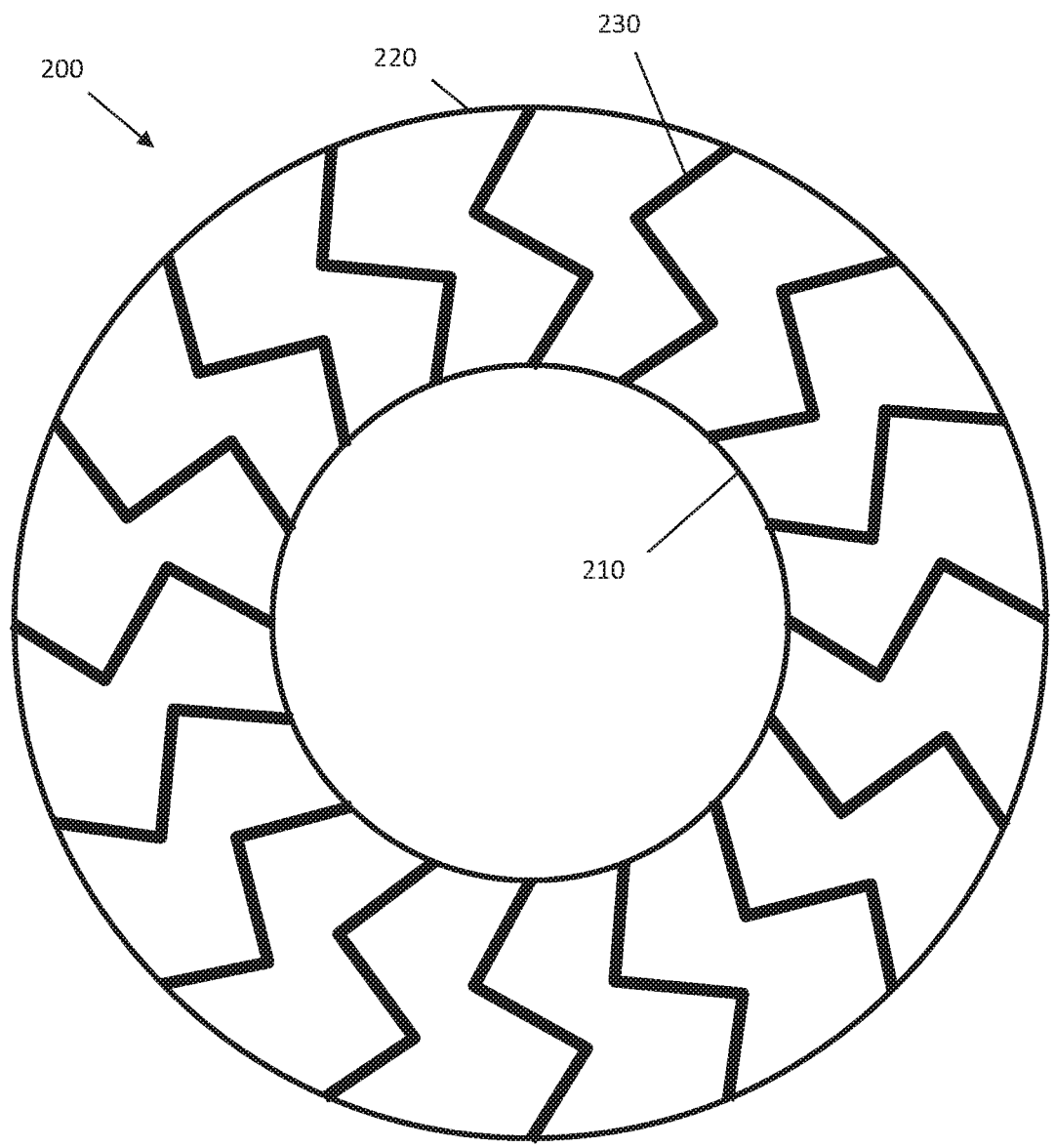
FIG. 4 is a front view of another alternative embodiment of a tire structure for a non-pneumatic tire.

FIG. 4 is a front view of another alternative embodiment of a tire structure 200 for a non-pneumatic tire. The tire structure 200 has a generally annular inner ring 210, a generally annular outer ring 220, and support structure in the form of spokes 230 extending between the inner ring 210 and the outer ring 220. In the illustrated embodiment, 16 non-linear spokes are shown extending in a generally radial direction. Each spoke is bent at sharp angles at two locations. However, it should be understood that any number of spokes may be employed in any geometry and orientation. It should be understood that the geometries shown in FIGS. 1-4 are merely exemplary and that any geometries may be employed.

Figure 5A:
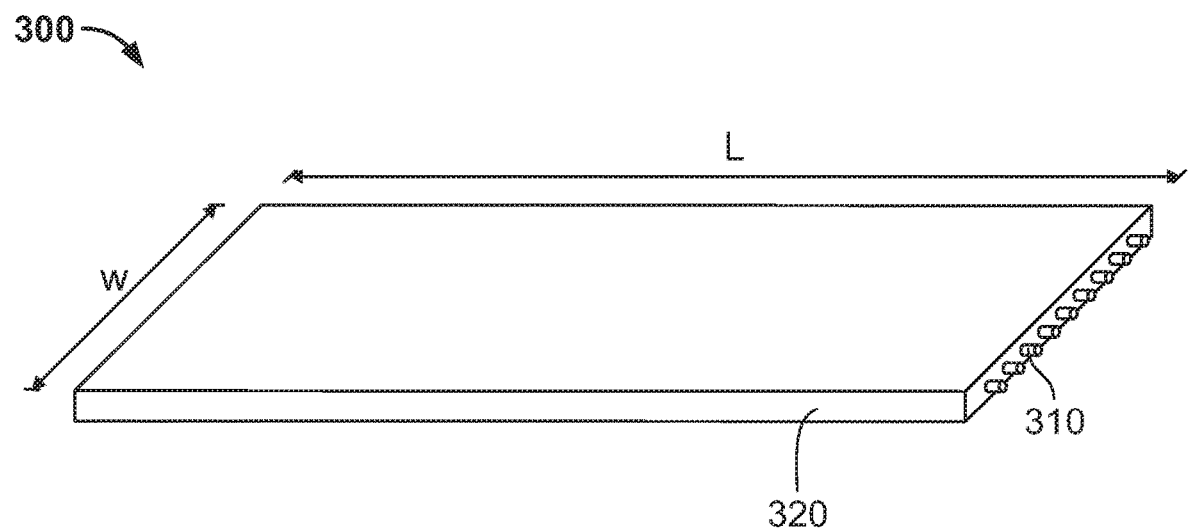
FIG. 5A is a schematic drawing illustrating a perspective view of one embodiment of a reinforced sheet.

FIG. 5A is a schematic drawing illustrating a perspective view of one embodiment of a reinforced sheet 300. The reinforced sheet 300 has a length L in a longitudinal direction, and a width W in a lateral direction. The length L is greater than the width W. Thus, the sheet 300 may be referred to as an elongated sheet.

In one embodiment, the reinforced sheet 300 includes reinforcement cords 310 extending in a longitudinal direction, and which are embedded in a thermoplastic material 320. The reinforcement cords 310 are constructed of a high strength material. Exemplary materials for reinforcement cords 310 include, without limitation, polyester, nylon, aramid, glass, steel, and other metal. In one specific embodiment, the thermoplastic material 320 is a thermoplastic elastomer resin. An exemplary thermoplastic elastomer resin is commercially sold under the brand name HYTREL by DUPONT. However, it should be understood that any thermoplastic elastomer resin may be employed. Thermoplastic elastomer resins exhibit desirable resilience, heat and chemical resistance, strength, and durability. However, other polymeric materials may be selected to embed the reinforcement cords if different properties are desired.

The reinforced cords 310 may be embedded in the thermoplastic material 320 through pultrusion, co-extrusion, or other means of cord coating. The resulting reinforced sheet 300 would be flexible due to thin gauge and low modulus.

Figure 5B:
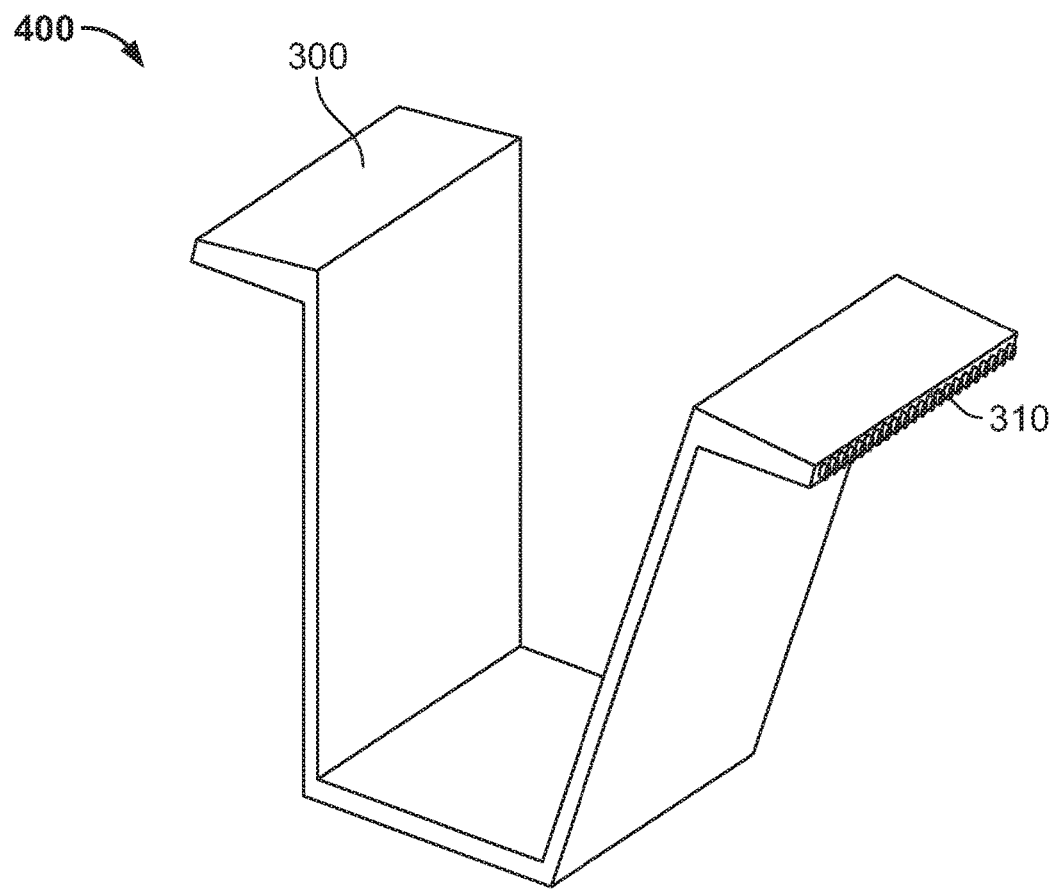
FIG. 5B is a perspective view of one embodiment of the reinforced sheet formed into a non-linear component.

After the reinforced sheet 300 is formed, it is cut and formed into a plurality of non-linear components. Alternatively, a single reinforced sheet can be formed into a single non-linear component without first being cut. FIG. 5B is a perspective view of a portion of the reinforced sheet 300 formed into an exemplary non-linear component 400. The reinforced sheet 300 is cut and bent such that the reinforcement cords 310 extend in a longitudinal direction. In an alternative embodiment (not shown), the reinforced sheet may be cut at an angle such that the reinforcement cords extend at an acute angle with respect to the longitudinal direction. In another alternative embodiment (not shown), the reinforced sheet may be cut at an angle such that the reinforcement cords extend in a lateral direction.

In the illustrated embodiment, the non-linear component 400 is bent at sharp corners at four different locations. In an alternative embodiment, the non-linear component is bent in at least two locations. In other alternative embodiments, any number of locations may be bent, and the bending may form sharp corners or rounded corners.

In one embodiment, the step of forming non-linear components 400 from the reinforced sheet 300 includes applying heat and pressure to the reinforced sheet 300. For example, the reinforced sheet 300 may be placed in a mold. Alternatively, the non-linear components 400 may be formed by applying pressure without applying heat. For example, the reinforced sheet 300 may be stamped or shaped by rollers.

Any number of non-linear components may be formed in any number of geometries. For example, each non-linear component of a tire may have a different size and shape. However, for manufacturing efficiencies, it may be desirable to include a number of non-linear components having the same size and shape. Additionally, it may be also be desirable to use a non-linear component of one size and shape in a number of different types and sizes of tires.

Figure 6:
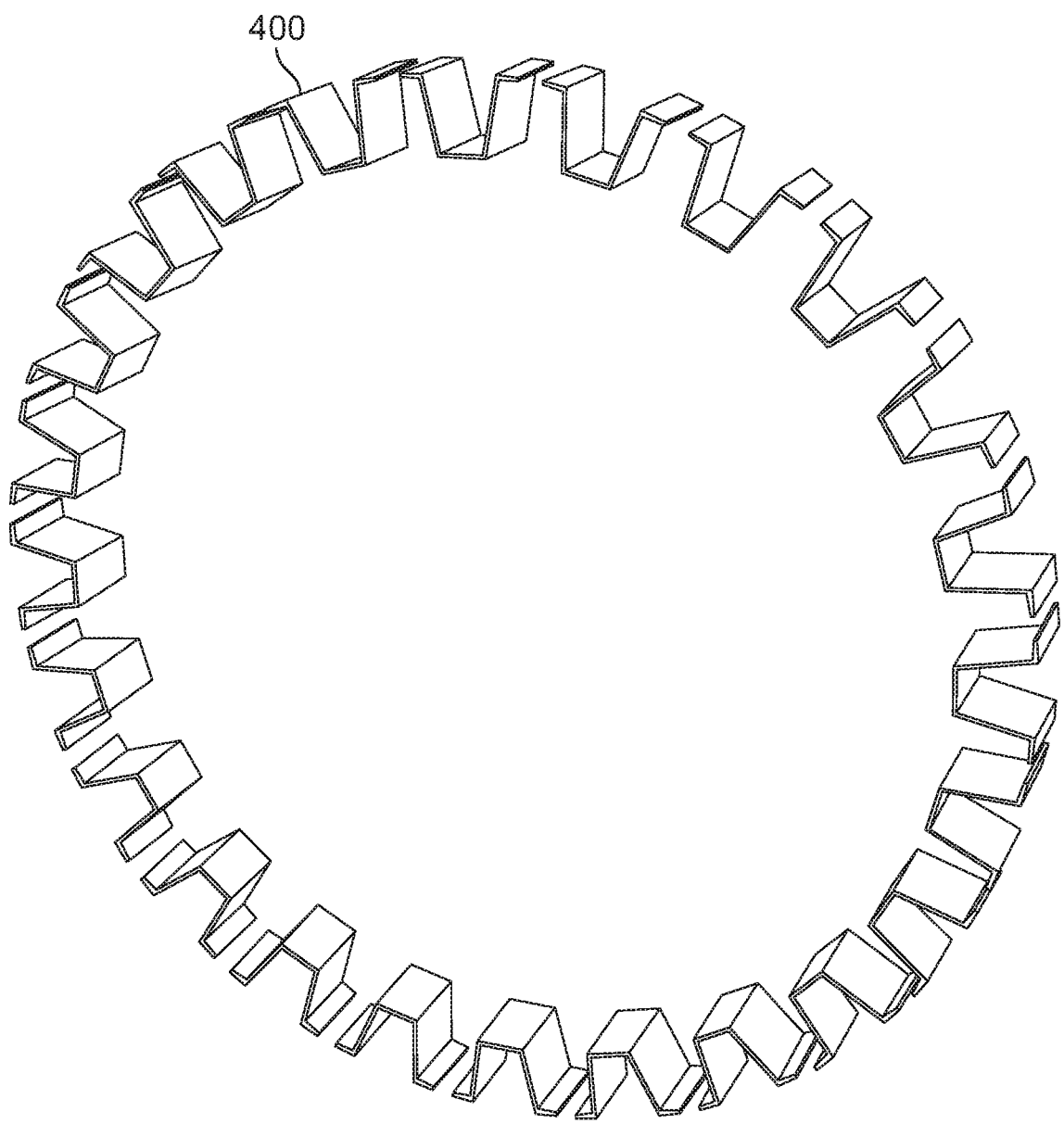
FIG. 6 is a perspective view of one embodiment of a plurality of non-linear components arranged in an annular shape.

After a desired number of non-linear components have been formed, they are arranged to form a support structure for a non-pneumatic tire. FIG. 6 is a perspective view of one embodiment of a plurality of non-linear components 400 arranged in an annular shape. In the illustrated embodiment, a single ring of non-linear components 400 having the same size and shape are placed in a spaced apart arrangement. In alternative embodiments, any number of sizes and shapes of non-linear components may be employed, and the components may be arranged in multiple rings and placed in contact with each other. In another alternative embodiment, different non-linear components may be constructed of different materials. For example, different components may have different reinforcement cords. Likewise, the reinforcement cords in different components may extend in different directions.

Figure 7:
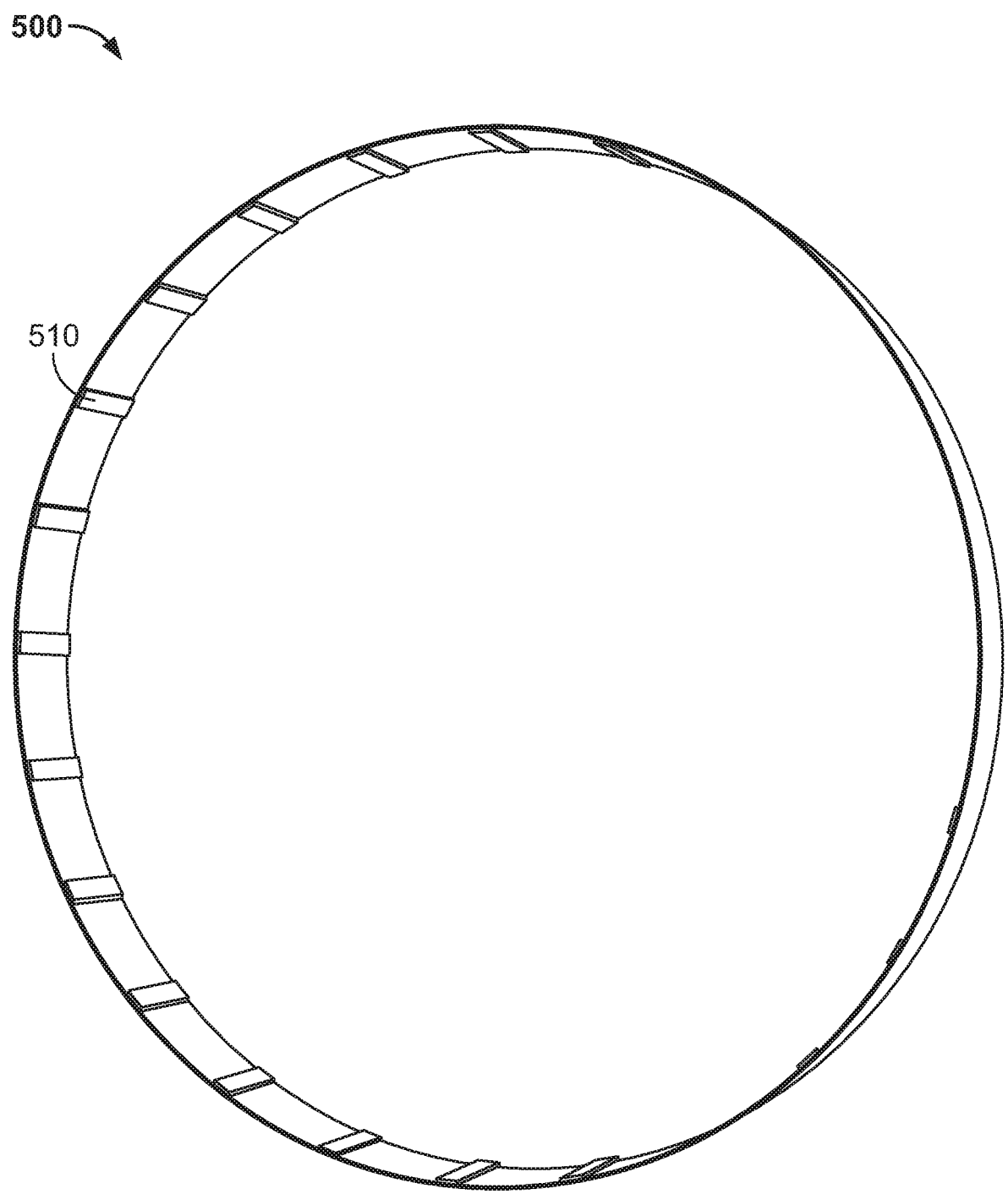
FIG. 7 is a perspective view of one embodiment of an outer ring for a non-pneumatic tire.

In one embodiment, an inner ring and an outer ring are formed separately from the plurality of non-linear components. The inner ring has an axis of rotation and a first diameter, and the outer ring is coaxial with the inner ring and has a second diameter greater than the first diameter. FIG. 7 is a perspective view of one embodiment of an outer ring 500 for a non-pneumatic tire. In one embodiment, the outer ring may be formed of the same material as the non-linear components. In an alternative embodiment, the outer ring is formed of a material different from the non-linear components. For example, the outer ring may be formed of a polymeric material or metal.

In the illustrated embodiment, the outer ring 500 includes a plurality of spaced apart lugs 510 formed on an inner surface. In one embodiment, the lugs 510 are constructed of the same material as the outer ring 500. For example, the lugs may be formed of a polymeric material or metal. In such an embodiment, the outer ring 500 and lugs 510 may be formed together in a molding process. In an alternative embodiment, the lugs 510 are formed separately from the outer ring 500 and are later attached. For example, the lugs 510 may be attached to the outer ring 500 with an adhesive or by a chemical bonding process. Alternatively, the lugs 510 may be attached to the outer ring 500 by welding or brazing. In an alternative embodiment (not shown), the outer ring does not include lugs.

In one embodiment, neither the outer ring 500 nor the lugs 510 include reinforcement cords. In an alternative embodiment, the outer ring has reinforcement cords embedded therein. In another alternative embodiment, the lugs have reinforcement cords embedded therein.

The inner ring may be constructed in a similar manner. In one embodiment, the inner ring and the outer ring are constructed of the same material. In an alternative embodiment, the inner ring is constructed of a material different from the material of the outer ring. In one embodiment, the inner ring includes a plurality of lugs on an outer surface. In another alternative embodiment, the inner ring does not include lugs.

Figure 8A:
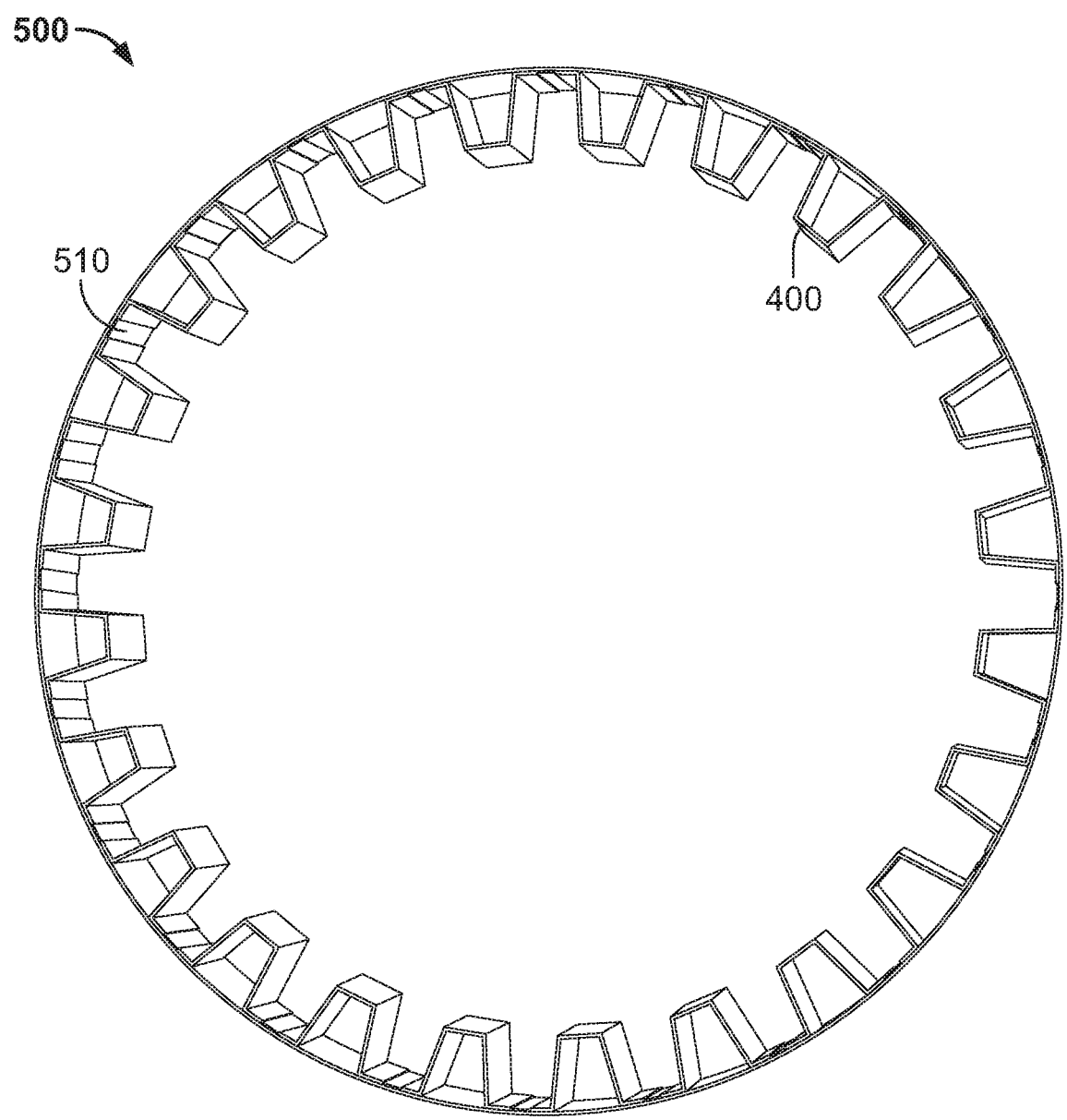
FIG. 8 is a perspective view of the plurality of non-linear components of FIG. 6 attached to the outer ring of FIG. 7.
Figure 8B:
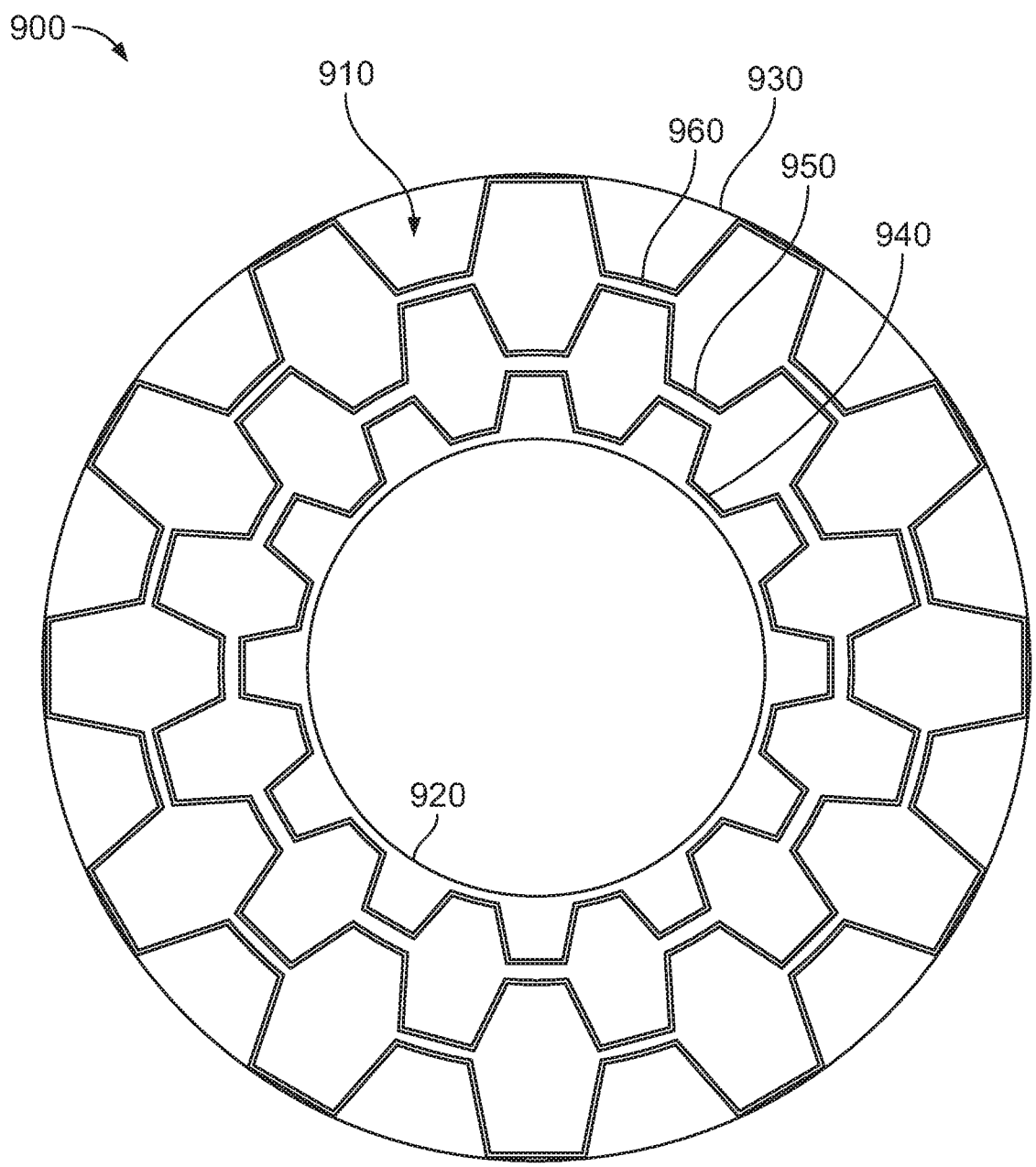

FIG. 8 is a perspective view of the plurality of non-linear components 400 attached to the outer ring 500. In the illustrated embodiment, a portion of each non-linear component 400 is attached directly to the outer ring 500, and a portion of each non-linear component 400 is attached to a lug 510. For both attachments, the non-linear components 400 may be attached to the an adhesive or by a chemical bonding process. Alternatively, the non-linear components 400 may be attached by welding or brazing.

Additional non-linear components may be added and attached the non-linear components 400 shown here. The attachment may likewise be done with an adhesive or a chemical bonding process, as well as by welding or brazing. This process may continue until the non-linear components are attached to an inner ring, and the non-linear components form a webbing extending from the inner ring to the outer ring. The non-linear components may likewise be attached to both the inner ring and lugs formed on the outer surface of the inner ring.

Figure 9:
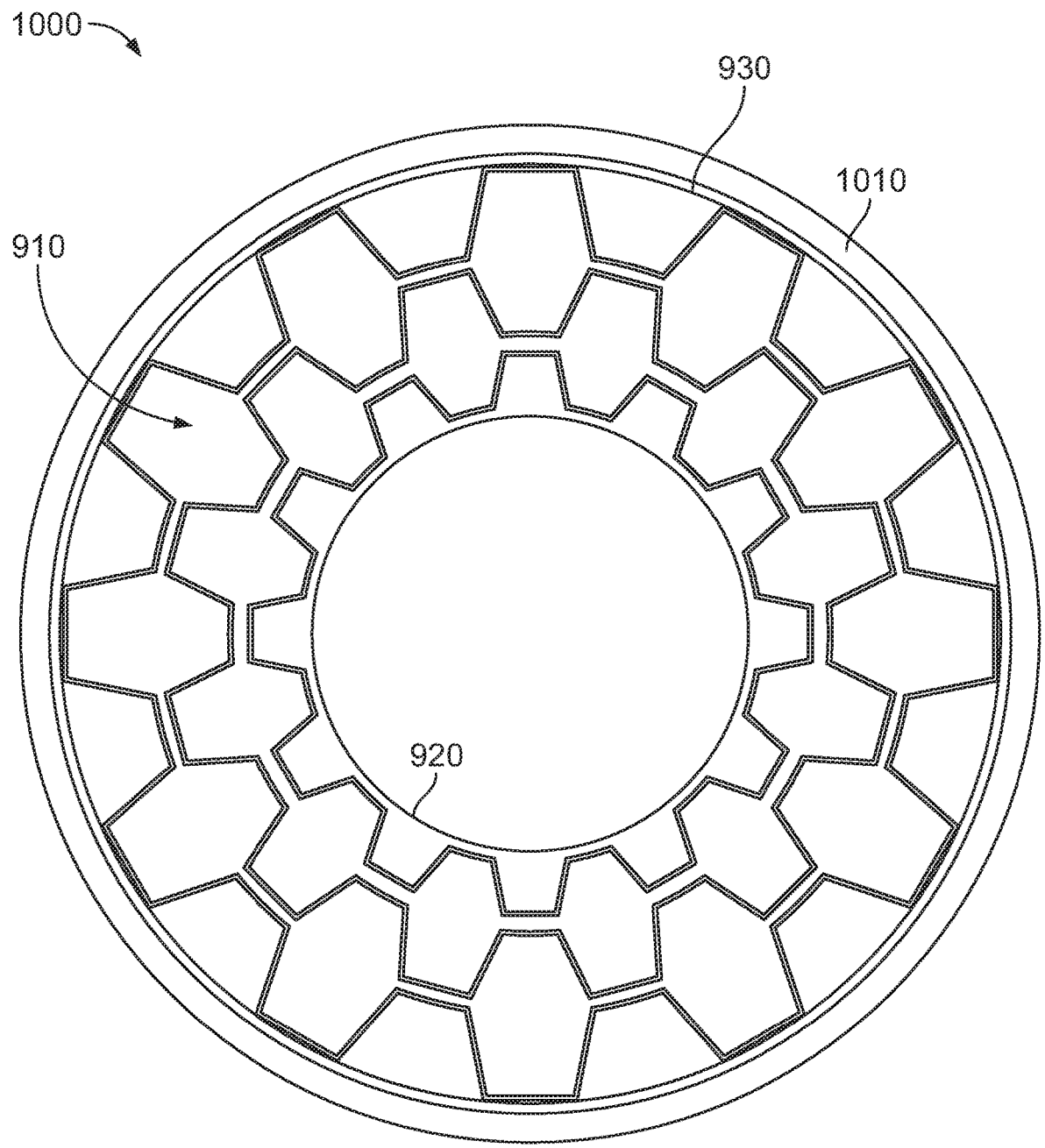
FIG. 9 is a schematic drawing illustrating a front view of an alternative embodiment of a webbing assembly.

FIG. 9 is a schematic drawing illustrating a front view of an alternative embodiment of a webbing assembly 900. In the illustrated embodiment, a plurality of non-linear components form a webbing 910 that extends between an inner ring 920 and an outer ring 930. In the illustrated embodiment, neither the inner ring 920 nor the outer ring 930 includes lugs. Instead, the non-linear components of the webbing 910 are directly attached to the inner ring 920 and the outer ring 930.

In one embodiment, the webbing 910 is constructed first by arranging and attaching a plurality of non-linear components to each other, in one of the manners described above. In the illustrated embodiment, non-linear components are attached to each other in a series of concentric rings that are then attached to each other. As shown here, the non-linear components form an inner web ring 940, a middle web ring 950, and an outer web ring 960. The concentric rings are shown as spaced apart of illustrative purposes. In alternative embodiments, any number of web rings may be formed.

After the webbing 910 is formed, it may then be attached to the inner ring 920 and the outer ring 930 using one of the attachment methods described above. In an alternative embodiment, the webbing 910 is attached to the inner ring 920 and the outer ring 930 by spin welding. Spin welding is a friction welding technique used on thermoplastic materials, in which the parts to be welded are heated by friction. The heat may be generated by turning the webbing 910 while holding the inner ring 920 and the outer ring 930 stationary against the hoop, or by turning the inner ring 920 and the outer ring 930 while holding the webbing 910 stationary against the inner ring 920 and the outer ring 930. This is continued until the heat of friction between the parts reaches a sufficient level for the parts to weld. The stationary part is then released to spin as well, while pressure is applied along the axis of rotation, holding the parts together as they cool. Such a process may require the hoop to have a thickness that is greater than a predetermined minimum thickness.

In another embodiment, the webbing assembly 900 is formed by placing the non-linear components in a mold. Polymeric material is then injected into the mold such that it surrounds the non-linear components. Heat or pressure may be added during this process. The injected material then cools, thus embedding the non-linear components. This process may be referred to as an overmolding process. In one such embodiment, the polymeric material that is injected in the mold is a different material from the non-linear components. Thus, the thermoplastic material of the support structure is embedded in a polymeric material different from the thermoplastic material.

In one embodiment of an overmolding process, reinforced thermoplastic material is placed throughout the entire mold, such that the resulting webbing is reinforced in its entirety. In an alternative embodiment, some portions of the mold do not have reinforced thermoplastic material placed therein. For example, the mold portions defining the inner ring or the outer ring may not have reinforced thermoplastic material placed therein.

After the webbing structure is built, a non-pneumatic tire may be completed by providing tread rubber and affixing the tread rubber to the outer ring of polymeric material. FIG. 10 is a schematic drawing illustrating a front view of one embodiment of a non-pneumatic tire 1000. In the illustrated embodiment, the non-pneumatic tire 1000 includes the webbing 910 extending from the inner ring 920 to the outer ring 930 In the illustrated embodiment, the webbing 910 has a plurality of geometric openings, wherein at least one of the geometric openings has a sharp corner. In an alternative embodiment, the non-linear components form spokes instead of a webbing, such as the spoke embodiment shown in FIG. 4.

Tread rubber 1010 is affixed to the outer ring 930. The tread rubber may be affixed with adhesive or a chemical bonding processing. The affixing may include an application of heat or pressure. The tread rubber 1010 may have tread elements formed therein, such as ribs, blocks, lugs, grooves, sipes, and other tread elements. The tread rubber may also include internal structures, such as a shear band.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
an inner ring having an axis of rotation;
an outer ring coaxial with the inner ring;
a plurality of lugs disposed on the outer ring, the plurality of lugs being constructed of a polymeric material, wherein the plurality of lugs lack reinforcement cords;
support structure extending from the inner ring to the outer ring, the support structure being constructed of a thermoplastic material and having reinforcement cords embedded therein,
wherein the support structure includes a plurality of non-linear components connected to each other with an adhesive, and
wherein a first end of a first non-linear component is connected to a first lug and a second end of the first non-linear component is connected to a second lug adjacent to the first lug; and
a circumferential tread extending about the outer ring.

2. The non-pneumatic tire of claim 1, wherein the support structure is a web having a plurality of geometric openings, wherein at least one of the plurality of geometric openings has a plurality of corners.

3. A method of making a non-pneumatic tire, the method comprising:
providing an inner ring having a first diameter;
providing an outer ring having a second diameter greater than the first diameter;
forming a plurality of lugs on the outer ring;
providing at least one thermoplastic sheet having reinforcement cords disposed therein;
forming a plurality of non-linear components from the at least one thermoplastic sheet;
connecting the plurality of non-linear components to the outer ring and to the plurality of lugs to form a support structure; and
connecting the support structure to the inner ring.

4. The method of claim 3, wherein the forming of the plurality of non-linear components from the at least one thermoplastic sheet includes applying heat and pressure to the at least one thermoplastic sheet to shape the at least one thermoplastic sheet.

5. The method of claim 3, wherein the forming of the plurality of non-linear components from the at least one thermoplastic sheet includes cutting the at least one thermoplastic sheet.

6. The method of claim 3, wherein the forming of the plurality of non-linear components from the at least one thermoplastic sheet includes bending the at least one thermoplastic sheet in at least two locations.

7. The method of claim 3, wherein the providing of the at least one thermoplastic sheet having reinforcement cords disposed therein includes a step of providing reinforcement cords and a step of coating the reinforcement cords with a thermoplastic material.

8. The method of claim 7, wherein the coating of the reinforcement cords with the thermoplastic material includes pultruding the reinforcement cords with the thermoplastic material.

9. The method of claim 3, wherein the connecting of the plurality of non-linear components together to form the support structure includes connecting the plurality of non-linear components together to form a web.

10. A method of making a non-pneumatic tire, the method comprising:
providing a plurality of reinforcement cords;
coating the plurality of reinforcement cords with a thermoplastic material, thereby forming a reinforced thermoplastic sheet;
cutting the reinforced thermoplastic sheet;
forming a plurality of non-linear components from the cut reinforced thermoplastic sheet;
arranging the plurality of non-linear components into an annular shape;
providing an inner ring having a first diameter;
providing an outer ring having a second diameter greater than the first diameter;
forming a plurality of lugs on the outer ring;
attaching the plurality of non-linear components to the inner ring; and
attaching the plurality of non-linear components to the outer ring and to the plurality of lugs.

11. The method of claim 10, wherein the arranging of the plurality of non-linear components into an annular shape includes placing the plurality of non-linear components in a mold.

12. The method of claim 11, further comprising injecting polymeric material into the mold.

13. The method of claim 10, further comprising attaching the plurality of non-linear components to each other.

14. The method of claim 10, wherein the arranging of the plurality of non-linear components into an annular shape includes arranging the plurality of non-linear components into spokes extending from the inner ring to the outer ring.

* * * * *